United States Patent Office 3,485,868
Patented Dec. 23, 1969

3,485,868
ATTRACTANTS FOR YELLOW JACKETS
(VESPULA spp.:VESPIDAE)
Gaines W. Eddy and Harry G. Davis, Corvallis, Oreg., and Morton Beroza, Silver Spring, and Terrence P. McGovern, Bowie, Md., assignors to the United States of America as represented by the Secretary of Agriculture
No Drawing. Filed Dec. 29, 1966, Ser. No. 623,154
Int. Cl. C07c 69/24; A01n 9/24; A01m 1/02
U.S. Cl. 260—488                                    8 Claims

ABSTRACT OF THE DISCLOSURE

The insect attractants of the present invention are highly specific for yellow jackets (Vespula spp.), attracting few other insects and no beneficial species such as honey bees. These attractants are organic esters having a total of from 9 to 12 carbon atoms, and they have at least one center of unsaturation, as exemplified by cis-3-hexenyl butyrate and 2-methylpentyl crotonate, or an alicyclic radical as in 4-methylcyclohexyl butyrate. The ester, 2,4-hexadienyl butyrate, was outstanding in field tests. Incorporated into compositions containing an insecticide, chemosterilant or other control agent, the attractants provide an improved means of reducing or eliminating populations of yellow jackets.

A non-exclusive, irrevocable, royalty-free license in the invention herein described, throughout the world for all purposes of the United States Government, with the power to grant sublicenses for such purposes, is hereby granted to the Government of the United States of America.

This invention relates to compounds useful for attracting yellow jackets (Vespula spp.), which are insects of medical and pestiferous importance. The invention relates further to combinations of these attractants with insect control agents, such as insecticides, chemosterilants, and the like to provide the respective attractant compositions.

According to one authority hymenopterous insects caused almost 50% of the 460 deaths attributed to venomous animals in the United States between 1950 and 1959. Of these almost 5% were caused by yellow jackets. However, these fatalities represent only a small percentage of the number of persons attacked, hospitalized, or otherwise imposed upon by these insects. Inasmuch as attractants have proved very useful as an aid in controlling other insect pests, it is anticipated that attractants would be useful similarly in combating yellow jackets. For example, the attractant may be used in a trap, poisonous bait, or distributed with a toxicant on a carrier. One of the especially desirable features of using attractants for control is that very little of the insecticide or insect control agent is required. The use of the instantly claimed attractants would be most efficient because such problems as do arise with yellow jackets often occur in a localized area. Attractants have a further advantage in that they can be used to lure the insects to their death, while at the same time, offering practically no chemical hazards to man, animals, or plants. The attractants herein described have still another desirable feature, in that they are highly specific for yellow jackets. They attracted few other insects, most of which were considered accidental catches, and no beneficial species such as honey bees.

An object of the present invention is to provide attractants in reducing or eliminating populations of yellow jackets. Another object is to provide yellow jacket attractants that are highly specific for this insect. A further object is to provide chemical yellow jacket attractant suitable for inclusion in compositions with insecticides, chemosterilants, and other insect control agents. Other objects will be apparent upon inspection of the specification and claims.

We have discovered that certain organic esters are highly specific as attractants for yellow jackets.

According to the present invention an attractant for yellow jackets comprises an ester having an alcohol moiety and an acid moiety, the ester having a total of from 9 to 12 carbon atoms per molecule, in which ester at least one of the moieties is aliphatic with at least one center of unsaturation or is alicyclic.

In a preferred embodiment of the invention the alcohol moiety of the organic ester is derived from an unsaturated aliphatic alcohol having five to seven carbon atoms, especially the 2,4-hexadienyl and cis-3-hexenyl groups (radicals), or is an alicyclic group such as cyclohexyl or 4-methylcyclohexyl.

In another embodiment of the present invention the center of unsaturation is in an aliphatic acid moiety of the ester, as in certain acrylates, methacrylates, crotonates, sorbates, and heptynoates. The ester can also have unsaturation in both the alcohol and acid moieties as in 2,4-hexadienyl esters of crotonic or tiglic acid.

The attractiveness for yellow jackets of the esters of the present invention was demonstrated by practical field tests. In a typical test, about 0.25 gram of the ester to be evaluated and 2 ml. of acetone were placed in the bottom of a pint glass jar which was rotated to distribute the compound. The jar was capped with an inverted screen cone having a ½-inch diameter hole at the apex of the cone. The jars were than placed in the field 1 to 2 feet apart on boards positioned about 3 feet off the ground. Tests were usually started at noon and terminated 24 or more hours later. Insects responding to the candidate lures entered the ½-inch orifice and were than unable to escape the trap.

Other aspects of testing, such as varying the amount of attractant, the time factors, and use of controls, are illustrated by the field test data presented in Table 1.

TABLE 1

Results of field tests on the attractiveness of materials to yellow jackets *Vespula pensylvanica*. Straight-sided pint glass jars used as traps except as noted.

| Chemical | Amount per trap (ml.) | No. of yellow jackets caught (cumulative) after indicated hr. | | | | |
|---|---|---|---|---|---|---|
| | | 2 | 4 | 24 | 48 | 72 |
| TEST OF SEPT. 15, 1964 | | | | | | |
| 2,4-hexadienyl butyrate | 0.5 | | | 48 | | |
| | 0.05 | | | 2 | | |
| | 0.005 | | | 1 | | |
| 2,4-hexadienyl propionate | 0.5 | | | 18 | | |
| | 0.05 | | | 1 | | |
| | 0.005 | | | 0 | | |
| 2,4-hexadienyl isobutyrate | 0.5 | | | 16 | | |
| | 0.05 | | | 4 | | |
| | 0.005 | | | 0 | | |
| Controls: | | | | | | |
| Acetone [1] | | | | 0 | | |
| Water | | | | 0 | 0 | |
| TEST OF OCT. 1, 1964 | | | | | | |
| 2,4-hexadienyl butyrate | 0.5 | 37 | | 81 | 85 | |
| 2,4-hexadienyl propionate | 0.5 | 24 | | 28 | 40 | |
| 2,4-hexadienyl isobutyrate | 0.5 | 20 | | 33 | 34 | |
| n-Butyl sorbate | 0.5 | 4 | | 7 | 7 | |
| Sorbic acid | [2] | 0 | | 0 | 0 | |
| Amyl acetate | 0.05 | 0 | | 0 | 0 | |
| Controls: | | | | | | |
| Acetone | | 0 | | 0 | 0 | |
| Water | | 0 | | 0 | 0 | |
| TEST OF OCT. 6, 1964 | | | | | | |
| 2,4-hexadienyl butyrate | 0.25 | | | 11 | | |
| | 0.025 | | | 1 | | |
| 2,4-hexadienyl propionate | 0.25 | | | 0 | | |
| | 0.025 | | | 0 | | |
| 2,4-hexadienyl isobutyrate | 0.25 | | | 7 | | |
| | 0.025 | | | 0 | | |
| n-Butyl sorbate | 0.5 | | | 0 | | |
| Control: Acetone | | | | 0 | | |
| TEST OF OCT. 8, 1964 | | | | | | |
| n-Butyl sorbate | 0.5 | | | 5 | 12 | 12 |
| Control: Acetone | | | | 0 | 0 | 0 |
| TEST OF OCT. 13, 1964 | | | | | | |
| n-Butyl sorbate | 0.25 | 3 | | 3 | 7 | |
| 2,4-hexadien-1-ol | 0.25 | 0 | | 0 | 0 | |
| Sorbaldehyde | 0.25 | | | 0 | 1 | |
| 2,4-hexadienyl butyrate | 0.25 | 20 | [3] 33 | | | |
| 2,4-hexadienyl-p-anisate | 0.25 | 0 | | 0 | 0 | |
| Control: Acetone | | 0 | | 0 | 0 | |
| TEST OF OCT. 15, 1964 [4] (Pint Jars) | | | | | | |
| Butyric acid | 0.25 | | | 0 | | |
| Propionic acid | 0.25 | | | 0 | | |
| 2,4-hexadienyl butyrate | 0.25 | | | 94 | | |
| Control: Acetone | | | | 0 | | |
| (Gallon Jars) | | | | | | |
| Butyric acid | 0.25 | | | | | 0 |
| Propionic acid | 0.25 | | | | | 0 |
| 2,4-hexadienyl butyrate | 0.25 | | | | | 39 |
| Control: Acetone | | | | | | 0 |
| TEST OF OCT. 22, 1964 [5] (Pint Jars) | | | | | | |
| 2,4-hexadienyl butyrate | 0.5 | | | 58 | | |
| 2,4-hexadienyl acetate | 0.5 | | | 0 | | |
| 2,4-hexadienyl chloroacetate | 0.5 | | | 1 | | |
| 2,4-hexadienyl o-ethoxybenzoate | 0.5 | | | 0 | | |
| 2,4-hexadienyl p-toluate | 0.5 | | | 0 | | |
| Control: Acetone | | | | 0 | | |

[1] Two ml. of solvent was added to all control jars since this amount was used with attractants; water was used as a second control in some tests.
[2] 500 mg.
[3] Removed from test after 4 hours due to high attractiveness.
[4] Both size jars equipped with inverted screen cones.
[5] Jars equipped with solid metal lids with ½-in. hole in center.

TABLE 2.—PHYSICAL CONSTANTS OF NEW ESTERS TESTED AS ATTRACTANTS FOR YELLOW JACKETS

| Ester | B.P. (° C./mm.) | $n_D^{25}$ | Mol. form. | Elemental Analyses [1] | | | |
|---|---|---|---|---|---|---|---|
| | | | | Theory | | Found | |
| | | | | Percent C | Percent H | Percent C | Percent H |
| 2,4-hexadienyl butyrate | 110–11/18 | 1.4696 | $C_{10}H_{16}O_2$ | 71.39 | 9.59 | 71.34 | 9.52 |
| 2,4-hexadienyl crotonate | 78/1.5 | 1.4937 | $C_{10}H_{14}O_2$ | 72.26 | 8.49 | 72.05 | 8.30 |
| 2,4-hexadienyl 2-methylbutyrate | 57/0.6 | 1.4646 | $C_{11}H_{18}O_2$ | 72.49 | 9.96 | | |
| 2,4-hexadienyl valerate | 125/20 | 1.4648 | $C_{11}H_{18}O_2$ | 72.49 | 9.96 | 72.15 | 10.06 |
| 2,4-hexadienyl isobutyrate | 58–9/1 | 1.4654 | $C_{10}H_{16}O_2$ | 71.39 | 9.59 | 71.77 | 9.64 |
| 2,4-hexadienyl propionate | 120/28 | 1.4734 | $C_9H_{14}O_2$ | 70.10 | 9.15 | 70.14 | 9.34 |
| 2,4-hexadienyl isovalerate | 85–6/3.5 | 1.4638 | $C_{11}H_{18}O_2$ | 72.49 | 9.96 | 72.17 | 9.87 |
| 2,4-hexadienyl pivalate | 49/0.04 | 1.4576 | $C_{11}H_{18}O_2$ | 72.49 | 9.96 | 72.76 | 9.84 |
| 2,4-hexadienyl tiglate | 72/0.04 | 1.4938 | $C_{11}H_{16}O_2$ | 73.30 | 8.95 | | |
| 2,4-hexadienyl chloroacetate | 77–8/1 | 1.4979 | $C_8H_{11}ClO_2$ | 55.02 | 6.35 | | |
| 2,4-hexadienyl acetate | 94–5/31 | 1.4731 | $C_8H_{12}O_2$ | 68.54 | 8.63 | 68.84 | 8.64 |
| 2,4-hexadienyl hexanoate | 140/20 | 1.4675 | $C_{12}H_{20}O_2$ | 73.43 | 10.27 | 72.71 | 10.18 |
| 2,4-hexadienyl 3-methylcrotonate | 70/0.4 | 1.4966 | $C_{11}H_{16}O_2$ | 73.30 | 8.95 | 73.65 | 9.26 |
| Cis-3-hexenyl butyrate | 96/20 | 1.4287 | $C_{10}H_{18}O_2$ | 70.54 | 10.66 | 70.24 | 10.81 |
| 4-methylcyclohexyl butyrate | 109/20 | 1.4379 | $C_{11}H_{20}O_2$ | 71.69 | 10.94 | 71.43 | 11.13 |
| 1-ethyl-2-methylallyl butyrate | 83/25 | 1.4226 | $C_{10}H_{18}O_2$ | 70.54 | 10.66 | 70.22 | 10.58 |
| Cyclohexyl butyrate [2] | 99/20 | 1.4391 | $C_{10}H_{18}O_2$ | 70.54 | 10.66 | 70.30 | 10.62 |
| 1-methyl-3-butenyl butyrate | 69/18 | 1.4158 | $C_9H_{16}O_2$ | 69.19 | 10.32 | 69.05 | 10.35 |
| 1-propyl-2-propynyl butyrate | 88/20 | 1.4243 | $C_{10}H_{16}O_2$ | 71.39 | 9.59 | 71.27 | 9.50 |
| 1,1,2-trimethyl-3-butenyl butyrate | 86/20 | 1.4284 | $C_{11}H_{20}O_2$ | 71.69 | 10.94 | 71.58 | 10.82 |
| 1-isopropylallyl butyrate | 76/33 | 1.4196 | $C_{10}H_{18}O_2$ | 70.54 | 10.66 | 70.68 | 10.60 |
| 1,3-dimethyl-2-butenyl butyrate | 81/19 | 1.4258 | $C_{10}H_{18}O_2$ | 70.54 | 10.66 | 70.02 | 10.53 |
| 1-propyl-3-butenyl butyrate | 94/19 | 1.4243 | $C_{11}H_{20}O_2$ | 71.69 | 10.94 | 71.43 | 10.50 |
| 3-methylcyclohexyl butyrate | 107–8/20 | 1.4376 | $C_{11}H_{20}O_2$ | 71.69 | 10.94 | 71.15 | 11.23 |
| 1-propylallyl butyrate | 82–3/19 | 1.4200 | $C_{10}H_{18}O_2$ | 70.54 | 10.66 | 70.62 | 10.57 |
| 1,1-dimethyl-3-butenyl butyrate | 81–82/19 | 1.4260 | $C_{10}H_{18}O_2$ | 70.54 | 10.66 | 70.34 | 10.57 |
| 1-ethyl-1-methyl-2-butenyl butyrate | 114–6/40 | 1.4286 | $C_{11}H_{20}O_2$ | 71.69 | 10.94 | 71.50 | 10.76 |
| 1-pentylallyl butyrate | 111/20 | 1.4267 | $C_{12}H_{22}O_2$ | 72.68 | 11.18 | 72.81 | 11.26 |
| 1,1-dimethyl-2-oxo-propyl butyrate | 94–5/20 | 1.4208 | $C_9H_{16}O_3$ | 62.76 | 9.36 | 63.19 | 9.62 |
| 1,1-dimethylallyl butyrate | 61/21 | 1.4160 | $C_9H_{16}O_2$ | 69.19 | 10.32 | 68.71 | 10.40 |
| 1-ethyl-2-propynyl butyrate | 75–6/20 | 1.4232 | $C_9H_{14}O_2$ | 70.10 | 9.15 | 70.37 | 9.42 |
| 1-ethyl-2-butenyl butyrate | 84–5/20 | 1.4238 | $C_{10}H_{18}O_2$ | 70.54 | 10.66 | 70.71 | 10.63 |

[1] The compounds for which data is omitted could not be purified sufficiently for a good elemental analysis.
[2] Although previously reported [W. L. Hoffman. Riechstoffe u. Aromen 9, 273–6 (1959)] our refractive index was different. The compound was therefore analyzed.

Many of the esters evaluated as attractants for yellow jackets were synthesized for use in the field tests. The esters were prepared by reacting an alcohol with an acid chloride using pyridine as a hydrochloric acid scavenger. A typical procedure is illustrated by the following description of the preparation of 2,4-hexadienyl dl-2-methylbutyrate:

Dl-2-methylbutyryl chloride, 12.1 grams, was added dropwise to an ice cold solution of 2,4-hexadien-1-ol, 9.8 grams and pyridine, 8 grams, in 100 ml. of benzene. The solution was stirred vigorously during the addition and for 1 hour after the addition was completed. Ether was added (ca. 150 ml.) and the organic layer was extracted with water until the wash was neutral to litmus paper. The organic layer was dried over magnesium sulfate, filtered, and the ether and benzene removed under reduced pressure (water pump). After the addition of a small amount of hydroquinone the crude ester was distilled under high vacuum to give 13.4 grams of product which had the following constants: B.P. 56–7°/0.6 mm., $n_D^{25}$ 1.4646.

Chemical and physical constants of compounds not previously described in the literature are presented in Table 2. Also, the purity of the esters was checked by gas chromatography.

While the attractants of the present invention are not indicated to attract other insects, they are generally applicable to yellow jackets. As shown in Table 3, the species *Vespula atropilosa*, *Vespula pensylvanica* and *Vespula vulgaris* were collected in the area of Williamette Valley of Oregon and in Kamloops and Peter Hope Lake, British Columbia, Canada. In addition, three other species of Vespula were collected in tests conducted in the eastern part of the United States.

TABLE 3

Data pertaining to species of yellow jackets attracted to 2,4-hexadienyl butyrate during tests conducted over a three week period.

| Species | Date collected, 1965 | Location |
| --- | --- | --- |
| *Vespula atropilosa* | 9/9 | Sisters, Oregon. |
|  | 9/23 | Marys Peak, Oregon. |
| *V. pensylvanica* | (¹) | Corvallis, Oregon. |
|  | 9/9 | Marys Peak, Oregon. |
|  | 9/9 | Sweethome, Oregon. |
|  | 9/9 | Santiam Junct., Oregon. |
|  | 9/9 | Lost Lake, Oregon. |
|  | 9/9 | Sisters, Oregon. |
|  | 9/15 | Burns, Oregon. |
|  | 9/16 | LaGrande, Oregon. |
|  | 9/16 | Pendleton, Oregon. |
|  | 9/23 | Alsea, Oregon. |
|  | 9/29 | Peter Hope Lake, B. C., Canada. |
|  | 9/30 | Kamloops, B. C., Canada. |
| *V. vulgaris* | 9/30 | Marys Peak, Oregon. |

¹ Collections on many dates at this site.

As evident from the data, particularly the field tests of Sept. 15 and Oct. 1, of Table 1, the 2,4-hexadienyl esters of butyric, isobutyric and propionic acids are potent attractants for yellow jackets. In these and other field tests, 2,4-hexadienyl butyrate was the most effective attractant. For purposes of rating the materials tested, 2,4-hexadienyl butyrate has been assigned a value of 100 and the other compounds have been rated in comparison with it.

In Table 4, which summarizes data regarding a series of 2,4-hexadienyl esters, the attractiveness rating of each ester was determined by dividing the number of yellow jackets caught in traps containing that ester by the number caught in traps containing 2,4-hexadienyl butyrate under otherwise similar test conditions and then multiplying by 100.

The data of Table 4 shows that in the 2,4-hexadienyl series the acid moiety should contain 3 to 5 carbon atoms, a total of 9 to 11 carbon atoms per molecule of ester. Tables 5 and 6 contain other esters in which unsaturation is present or which have an alicyclic group. The effective yellow jacket attractants of these tables have from 9 to 12 carbon atoms, usually 10 or 11, per ester molecule. The most potent attractants having unsaturation in the alcohol moiety are 2,4-hexadienyl butyrate and cis-3-hexenyl butyrate, both containing a total of 10 carbon atoms. This number of carbon atoms is also contained in the best of the esters having an unsaturated acid moiety, 2-methylpentyl crotonate. The pentyl and isopentyl esters of 2-heptynoic acid (Table 6, No's 3 and 5) having 12 carbon atoms in the ester, are also among the better attractants.

TABLE 4

Comparison of some 2,4-hexadienyl esters as yellow jacket attractants in 24-hour field tests

| Compound No. | 2,4-hexadienyl ester | Attractiveness rating | Carbon atoms in ester |
| --- | --- | --- | --- |
| 1 | Acetate | 0 | 8 |
| 2 | Propionate | 40 | 9 |
| 3 | Isobutyrate | 42 | 10 |
| 4 | Butyrate | 100 | 10 |
| 5 | 2-methylbutyrate | 51 | 11 |
| 6 | Valerate | 43 | 11 |
| 7 | Isovalerate | 23 | 11 |
| 8 | Pivalate | 17 | 11 |
| 9 | Hexanoate | 0 | 12 |

TABLE 5

Relative attractiveness to yellow jackets of esters in which the alcohol moiety is unsaturated or alicyclic

| Compound No. | Ester | Attractiveness rating ¹ | Carbon atoms in ester |
| --- | --- | --- | --- |
| 1 | Cis-3-hexenyl butyrate | 73 | 10 |
| 2 | 4-methylcyclohexyl butyrate | 38 | 11 |
| 3 | 3-octynyl acetate | 26 | 11 |
| 4 | 1-ethyl-2-methylallyl butyrate | 23 | 10 |
| 5 | Cyclohexyl butyrate | 22 | 10 |
| 6 | 1-ethynylcyclohexyl acetate | 20 | 10 |
| 7 | 1-methyl-3-butenyl butyrate | 15 | 9 |
| 8 | 1-propyl-2-propynyl butyrate | 15 | 10 |
| 9 | 1,1,2-trimethyl-3-butenyl butyrate | 15 | 11 |
| 10 | 2-octynyl acetate | 15 | 10 |
| 11 | 1-isopropylallyl butyrate | 9 | 10 |
| 12 | 1,3-dimethyl-2-butenyl butyrate | 7 | 10 |
| 13 | 1-propyl-3-butenyl butyrate | 7 | 11 |
| 14 | 3-methylcyclohexyl butyrate | 5 | 11 |
| 15 | 1-propylallyl butyrate | 4 | 10 |
| 16 | 2-propynyl butyrate | 0 | 7 |

¹ 24-hour test; 2,4-hexadienyl butyrate=100.

TABLE 6

Relative attractiveness to yellow jackets of esters in which the acid moiety is α,β-unsaturated or alicyclic

| Compound No. | Ester | Attractiveness rating | Carbon atoms |
| --- | --- | --- | --- |
| 1 | 2-methylpentyl crotonate | 69 | 10 |
| 2 | 2,4-hexadienyl crotonate | 55 | 10 |
| 3 | Pentyl 2-heptynoate | 48 | 12 |
| 4 | 3-butynyl 2-heptynoate | 40 | 11 |
| 5 | Isopentyl 2-heptynoate | 40 | 12 |
| 6 | Hexyl methacrylate | 26 | 10 |
| 7 | Propyl 2-heptynoate | 25 | 10 |
| 8 | 2-ethylhexyl acrylate | 22 | 11 |
| 9 | Cyclohexyl crotonate | 18 | 10 |
| 10 | Allyl cyclohexanecarboxylate | 17 | 10 |
| 11 | 2,4-hexadienyl tiglate | 14 | 11 |
| 12 | Butyl sorbate | 13 | 10 |
| 13 | 4-methylcyclohexyl acrylate | 12 | 10 |

Some of the compounds contain centers of unsaturation in both the alcohol and acid moieties, as in 2,4-hexadienyl crotonate, 3-butynly 2-heptynoate or 2,4-hexadienyl tiglate (Table 6, No.'s 2, 3 and 1). Others have combinations of a center of unsaturation and an alicyclic group, as in 1-ethynylcyclohexyl acetate (Table 5, No. 6), cyclohexyl crotonate (Table 6, No. 9), or allyl cyclohexanecarboxylate (Table 6, No. 10). While these are active compounds, they are not as effective yellow jacket attractants as many esters containing a sole unsaturated aliphatic radical in the molecule.

The esters of the present invention are highly specific for yellow jackets. None of the various species of beneficial insects such as honey bees were caught by or seen near any of the materials tested.

These yellow jacket attractants can be formulated with materials commonly used in insect control art, such as baits, carriers, insecticides, chemosterilants, and other additives. Insecticides for yellow jackets useful in baits are compounds such as dimethyl (2,2,2-trichloro-1-hydroxyethyl) phosphonate, 2,2-dichlorovinyl dimethyl phosphate, and 1,2-dibromo-2,2-dichloroethyl dimethyl phosphate. The use of slow-acting insecticides or of chemosterilants in the attractant composition allows the yellow jacket to return to the nest, providing a more effective means of controlling yellow jacket population than trapping.

We claim:
1. A compound consisting of an ester of 2,4-hexadienol and an alkanoic acid having from 3–5 carbon atoms.
2. A compound as in claim 1 in which the ester is 2,4-hexadienyl butyrate.
3. A compound as in claim 1 in which the ester is 2,4-hexadienyl isobutyrate.
4. A compound as in claim 1 in which the ester is 2,4-hexadienyl propionate.
5. A compound as in claim 1 in which the ester is 2,4-hexadienyl 2-methylbutyrate.
6. A compound as in claim 1 in which the ester is 2,4-hexadienyl valerate.
7. A compound as in claim 1 in which the ester is 2,4-hexadienyl isovalerate.
8. A compound as in claim 1 in which the ester is 2,4-hexadienyl pivalate.

References Cited

UNITED STATES PATENTS

| 1,965,792 | 7/1934 | Chaux | 260—468 |
| 2,275,034 | 3/1942 | Moyle | 260—468 |
| 2,529,482 | 11/1950 | Businger | 260—488 |
| 2,644,012 | 6/1953 | Korman et al. | 260—468 |
| 2,797,235 | 6/1957 | Birbiglia | 260—488 |

FOREIGN PATENTS 6,401,031  8/1964  Netherlands.

OTHER REFERENCES

C. A., 43: 112–113 (1949).

LORRAINE A. WEINBERGER, Primary Examiner

V. GARNER, Assistant Examiner

U.S. Cl. X.R.

260—468, 473, 476, 486, 487; 424—84